United States Patent
Fernandes et al.

(10) Patent No.: US 9,825,582 B2
(45) Date of Patent: Nov. 21, 2017

(54) ROOFING PANELS WITH INTEGRATED PHOTOVOLTAIC CELLS AND METHOD OF INSTALLATION

(71) Applicant: Cogitur, Inc., Dartmouth, MA (US)

(72) Inventors: Nathaniel C. Fernandes, Dartmouth, MA (US); Michel Fernandes, Dartmouth, MA (US)

(73) Assignee: COGITUR, INC., Dartmouth, MA (US)

( * ) Notice: Subject to any disclaimer, the term of this patent is extended or adjusted under 35 U.S.C. 154(b) by 0 days.

(21) Appl. No.: 15/390,567

(22) Filed: Dec. 26, 2016

(65) Prior Publication Data

US 2017/0194895 A1    Jul. 6, 2017

Related U.S. Application Data

(60) Provisional application No. 62/273,083, filed on Dec. 30, 2015.

(51) Int. Cl.
*H02S 20/25* (2014.01)
*E04D 3/40* (2006.01)

(52) U.S. Cl.
CPC .............. *H02S 20/25* (2014.12); *E04D 3/40* (2013.01)

(58) Field of Classification Search
CPC .................................. H02S 20/25; E04D 3/40
USPC ....................................................... 52/789.1
See application file for complete search history.

(56) References Cited

U.S. PATENT DOCUMENTS

| | | | | |
|---|---|---|---|---|
| 3,835,609 A | * | 9/1974 | Oscar ...................... | E04D 1/08 52/478 |
| 4,000,850 A | * | 1/1977 | Diggs ..................... | F24D 3/005 126/613 |
| 4,244,355 A | | 1/1981 | Stout | |
| 4,394,529 A | * | 7/1983 | Gounder ................ | B64G 1/443 136/245 |
| 4,607,616 A | * | 8/1986 | Lehmann ................. | F24J 2/045 126/623 |
| 5,994,640 A | * | 11/1999 | Bansemir .................. | B32B 3/12 136/244 |
| 7,288,326 B2 | * | 10/2007 | Elzey ...................... | C22F 1/006 428/179 |
| 7,823,353 B2 | * | 11/2010 | Lynch ...................... | B27N 3/08 52/455 |
| 8,215,070 B2 | | 7/2012 | Railkar et al. | |
| 8,215,071 B2 | | 7/2012 | Lenox | |
| 8,309,840 B2 | | 11/2012 | Stevens et al. | |

(Continued)

FOREIGN PATENT DOCUMENTS

WO    WO 02101839 A1 * 12/2002 .............. E04D 1/34

*Primary Examiner* — Charles A Fox
*Assistant Examiner* — Joseph J. Sadlon
(74) *Attorney, Agent, or Firm* — Barlow, Josephs & Holmes, Ltd.

(57) ABSTRACT

A photovoltaic roofing panel, method of making an method of installing a roofing panel is disclosed, which includes a bottom panel having a lower surface configured to be secured to the roof of a building; a top panel; and at least one photovoltaic cell captured between the top panel and the bottom panel, where the roofing panel is configured to be fastened directly to the roof, and roofing materials, such as asphalt shingles, are configure to abut the roofing panel, forming a more seamless and aesthetically pleasing roofing structure that also generates solar power.

4 Claims, 10 Drawing Sheets

(56) References Cited

U.S. PATENT DOCUMENTS

| | | | |
|---|---|---|---|
| 8,402,715 B2* | 3/2013 | Uhllg | B32B 3/12 |
| | | | 52/309.1 |
| 8,404,967 B2* | 3/2013 | Kalkanoglu | B32B 17/10788 |
| | | | 136/251 |
| 8,424,256 B2* | 4/2013 | Cook | F24J 2/5228 |
| | | | 126/622 |
| 8,631,614 B2* | 1/2014 | Livsey | H01L 31/048 |
| | | | 52/173.3 |
| 8,671,630 B2 | 3/2014 | Lena et al. | |
| 8,713,860 B2 | 5/2014 | Railkar et al. | |
| 8,844,213 B2* | 9/2014 | Posnansky | E04D 1/125 |
| | | | 136/244 |
| 8,863,451 B2 | 10/2014 | Jenkins et al. | |
| 8,950,128 B2* | 2/2015 | Kalkanoglu | F24J 2/5245 |
| | | | 126/622 |
| 8,991,116 B2 | 3/2015 | Richardson | |
| 9,212,832 B2 | 12/2015 | Jenkins | |
| 9,236,515 B2* | 1/2016 | Brottier | H01L 31/0521 |
| 9,712,108 B2* | 7/2017 | Kokotov | H02S 40/36 |
| 2006/0032527 A1 | 2/2006 | Stevens et al. | |
| 2008/0083176 A1* | 4/2008 | Barsun | F24J 2/045 |
| | | | 52/173.3 |
| 2010/0051088 A1* | 3/2010 | Levin | H01L 31/0543 |
| | | | 136/246 |
| 2011/0225904 A1 | 9/2011 | Railkar et al. | |
| 2011/0314753 A1 | 12/2011 | Farmer et al. | |
| 2016/0244972 A1* | 8/2016 | Duarte | E04D 13/1475 |
| 2016/0254776 A1* | 9/2016 | Rodrigues | H02S 20/23 |

* cited by examiner

ROOFING PANELS WITH INTEGRATED PHOTOVOLTAIC CELLS AND METHOD OF INSTALLATION

CROSS-REFERENCE TO RELATED APPLICATION

This patent document claims priority to earlier filed U.S. Provisional Patent Application No. 62/273,083, filed Dec. 30, 2015, the entire contents of which are incorporated by reference.

BACKGROUND OF THE INVENTION

1. Field of the Invention

The instant invention relates to a roofing panel with an integrated photovoltaic cell, and a method of installation of the roofing panel.

2. Background of the Related Art

Solar panels on residential homes are costly, they are not aesthetically appealing, and they can create significant weatherproofing issues. The high cost is partly due to the complexity of the assembled panels and the time it takes to install the panels on an existing roof. If we factor in the cost to install the roof under the panels, the cost is even higher.

Traditional solar panel assemblies also do not blend in well with existing roofing shingles or other roofing materials, so the appearance is not acceptable. Furthermore, the installation requires fasteners to pierce through existing roofing materials and this type of installation often leads to leaks in the existing roof, costly damage and homeowners insurance issues.

Solar shingles are available but they are expensive, take a long time to install and they often do not blend in well with existing roofing materials.

Solar panels constructed with glass panels present additional problems. For example, firefighters dislike glass solar panels as the need often arises to walk on or cut through the solar panel to vent the building. Glass solar panels become slippery when wet, leading to slips and falls from the roof of the building. Cutting glass solar panels also creates the additional hazard of broken glass, not to mention the difficulty in actually cutting through the materials.

Glass, however, has become a material of choice in the solar industry because of its dimensional stability and transparency. Other construction materials, such as plastic, are not as dimensionally stable as glass. Plastics generally exhibit high thermal expansion properties, which can lead to buckling and degradation of solar panel efficiency.

Accordingly, there is a perceived need in the art for a solar panel that is lower in cost, that blends more aesthetically with existing roofing materials, and also lacks the disadvantages of glass solar panels, while also exhibiting dimensional stability.

SUMMARY OF THE INVENTION

The present invention provides a large, thin panel that is installed directly to the bare roof of a building or house, so that installing the panel is much like installing the roofing material.

Generally, the roofing panel has a bottom panel that has a lower surface configured to be secured to the roof of a building, a top panel, and at least one photovoltaic cell captured between the top panel and the bottom panel. A plurality of dimples distributed over the top surface of the bottom panel may be fastened to a bottom surface of the top panel, thereby providing additional dimensional stability to the roofing panel.

The present invention also provides a method of installing the roofing panel including the steps of providing at least one roofing panel having at least one integrated photovoltaic cell, positioning the lower surface of the bottom panel of the roofing panel so that the respective lower surface of the bottom panel is in adjacent facing relation with a roof of a building; and securing the roofing panel to the roof of the building by using fasteners.

The panel is designed with integrated flashing so other roofing material can be easily installed over and around the panel flashing.

Preferably, the panel is fastened directly to the roof with no complex hardware. For example, a user can use roofing nails only through the flashing. The electrical wiring for the panel is passed through openings in the roof before the remaining roofing materials are secured around the solar panel.

The roofing panel of the present invention is designed to blend in with roofing materials. The clear top layer is formed to match the various residential roofing materials (i.e. asphalt shingles, slate shingles, wood shake, etc.) that are typically used on roofs of buildings.

The design of the roofing panel primarily comprises a plastic bottom (or base) with integrated roof flashing, photovoltaic cells laminate layer, and a clear flat or formed top panel that also forms the integrated roof flashing.

Accordingly, among the objects of the instant invention are: the provision of a roofing panel with an integrated photovoltaic cell; the provision of a roofing panel that reduces assembly cost; the provision of a roofing panel that reduces weight; the provision of a roofing panel that reduces installation time; the provision or a roofing panel that serves the dual function of protecting a roof while converting solar energy to electrical energy; the provision of a photovoltaic cell integrated into a roofing panel that is aesthetically pleasing; and the provision of a roofing panel that resists thermal expansion. Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated of carrying out the present invention.

DESCRIPTION OF THE PREFERRED EMBODIMENT

Figure 8:
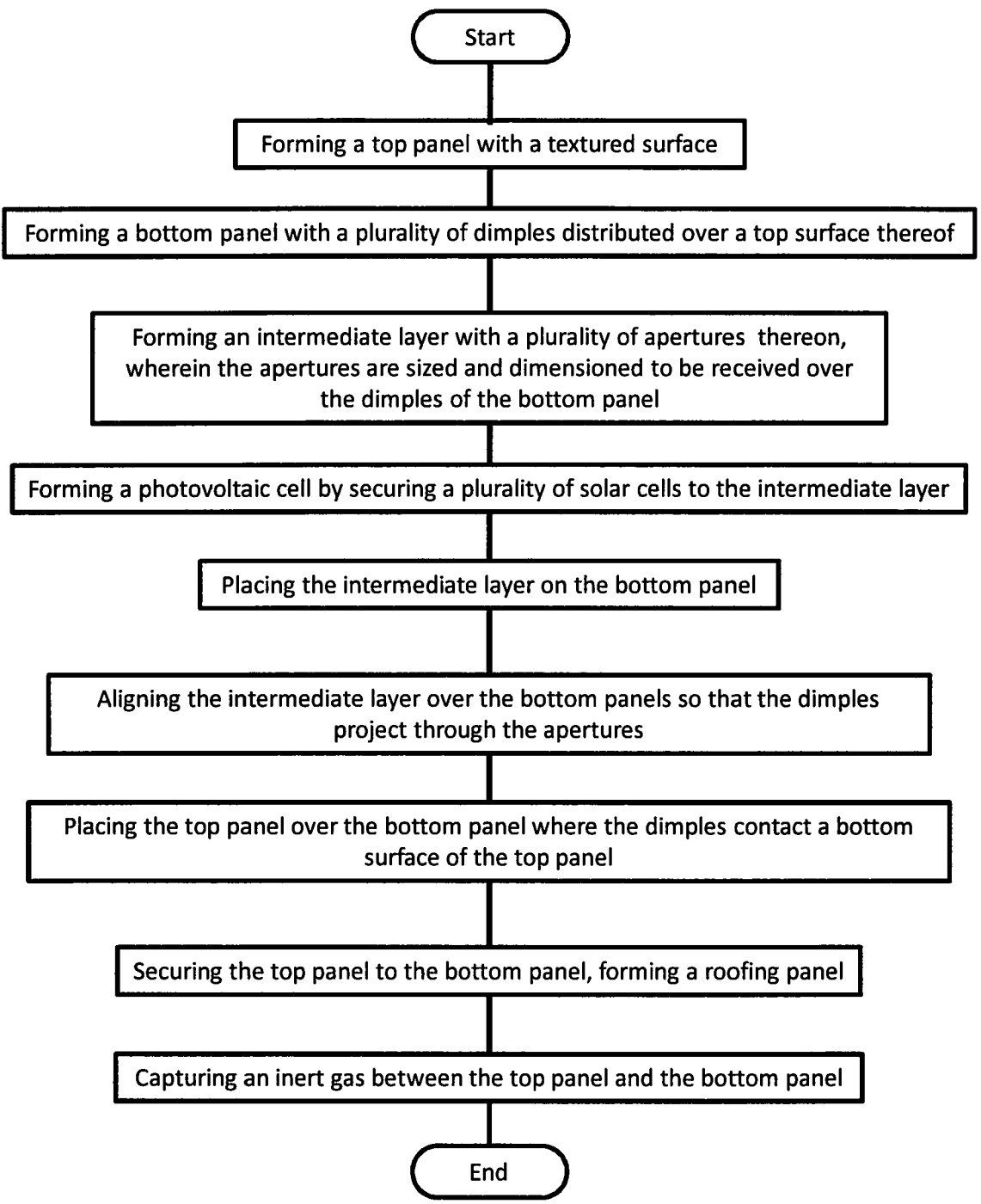
FIG. 8 is a flowchart of a method of assembling a roofing panel according to the present invention.
Figure 9:
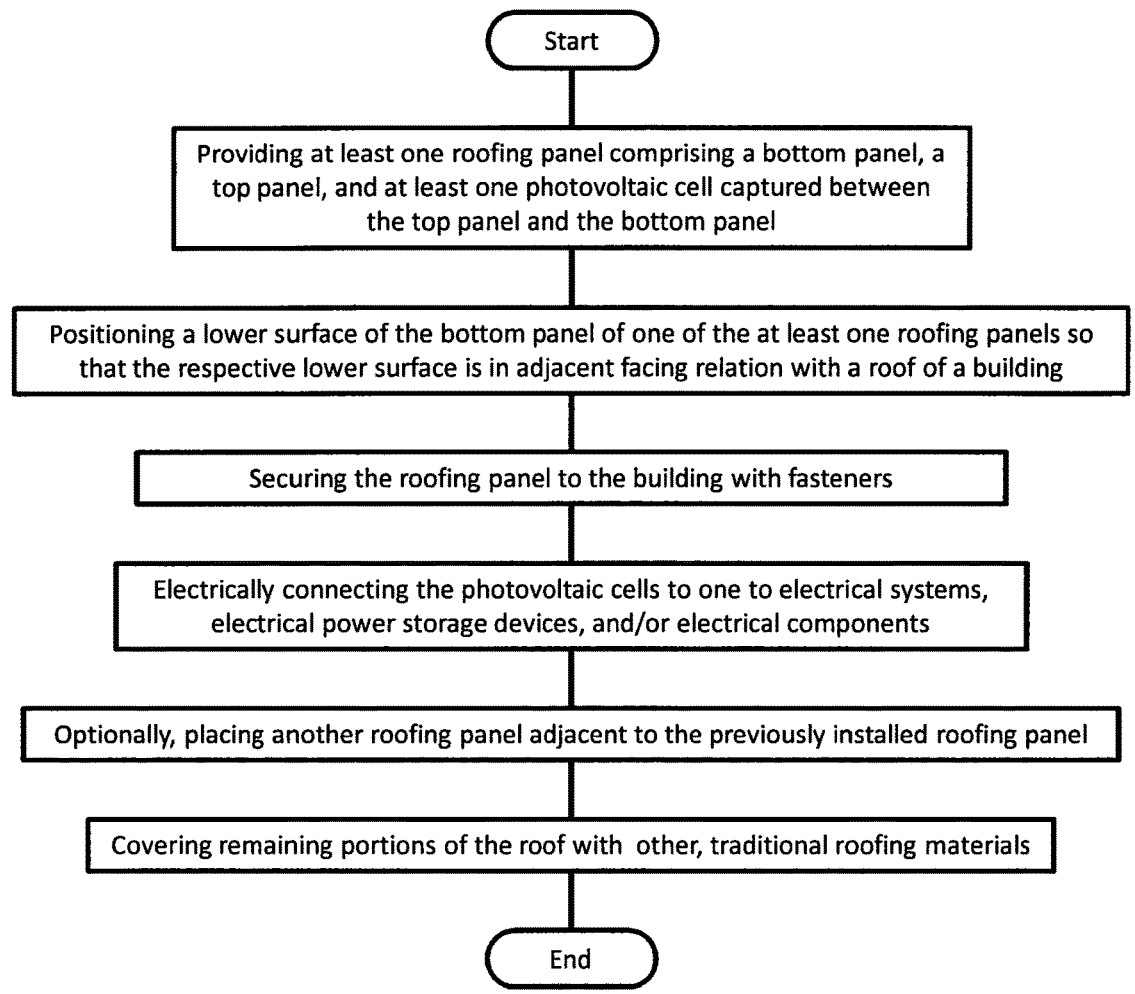
FIG. 9 is a flowchart of a method of installing one or more roofing panels on a rood of a building.
Figure 10:
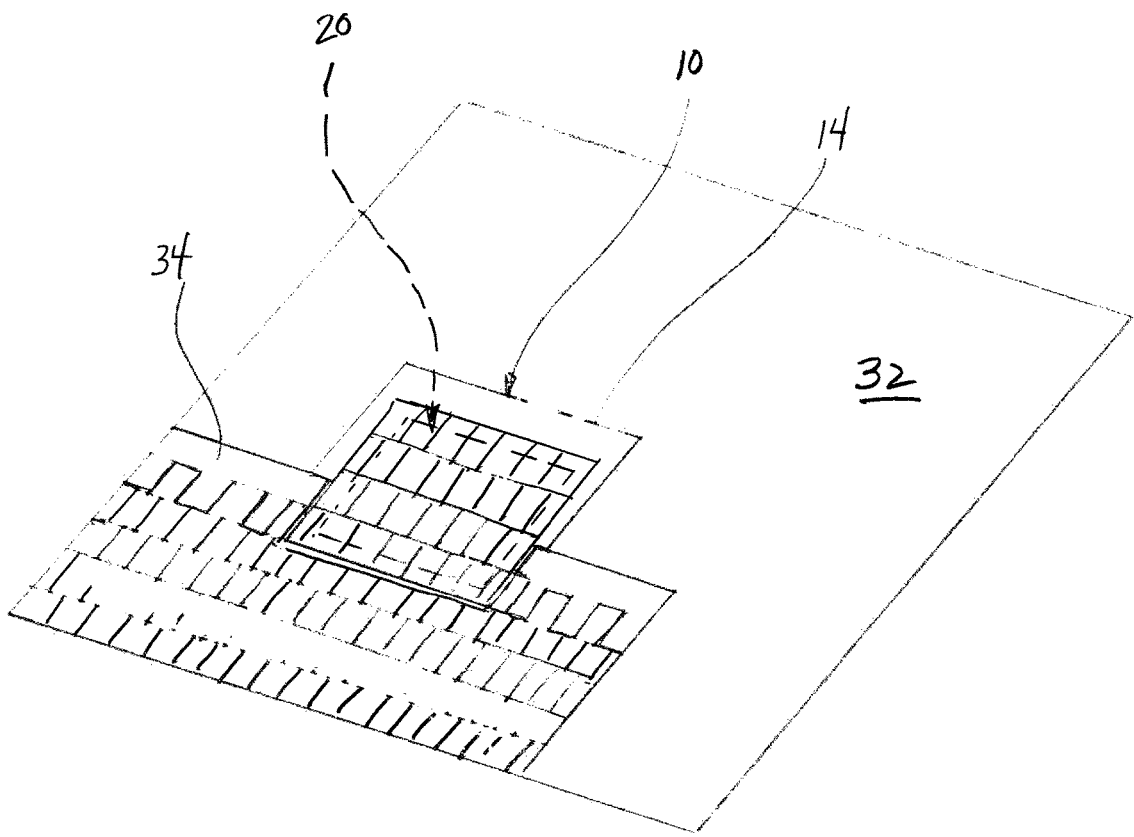
FIG. 10 shows a perspective view of an exemplary roofing panel being installed on a roof.

Referring now to the drawings, the roofing panel with integrated photovoltaic cell of the instant invention is illustrated in FIGS. 1-7. An exemplary method of manufacturing a roofing panel is illustrated in FIG. 8. An exemplary method of installing one or more roofing panels of the present invention on a roof of a building is illustrated in FIGS. 9 and 10. As will hereinafter be more fully described, the instant invention provides a roofing panel that has an integrated photovoltaic cell, and provides a method of installing the roofing panel on a roof of a building.

Figure 1:
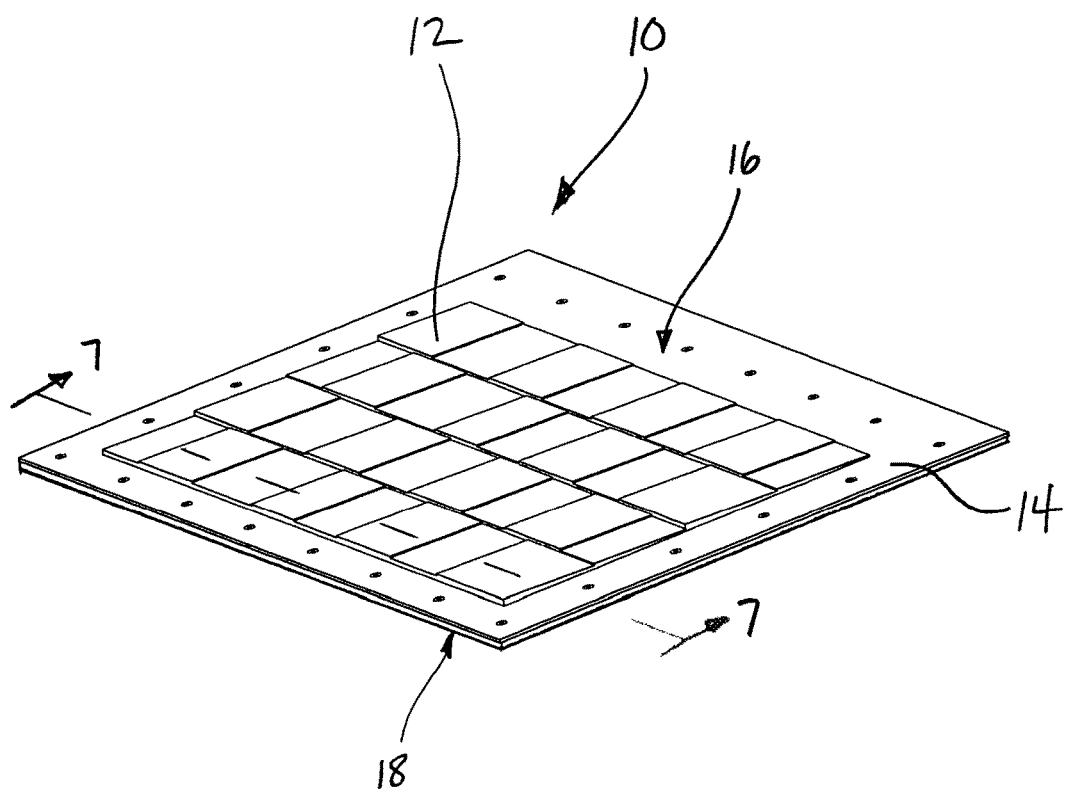
FIG. 1 is a perspective view of an embodiment of a roofing panel according to the present invention.

Referring to FIG. 1, an embodiment of the roofing panel with integrated photovoltaic cell is shown generally at 10. The roof panel 10 includes a textured outer surface 12, simulating roofing shingles, bounded by a flat peripheral edge portion forming flashing 14. As described further below, the flashing 14 is fastened to the roof with fasteners, such as roofing nails. Roofing shingles may then be arranged to overlap the flashing 14 and abut the textured surface 12, forming a seamless roofing surface for the building.

Figure 2:
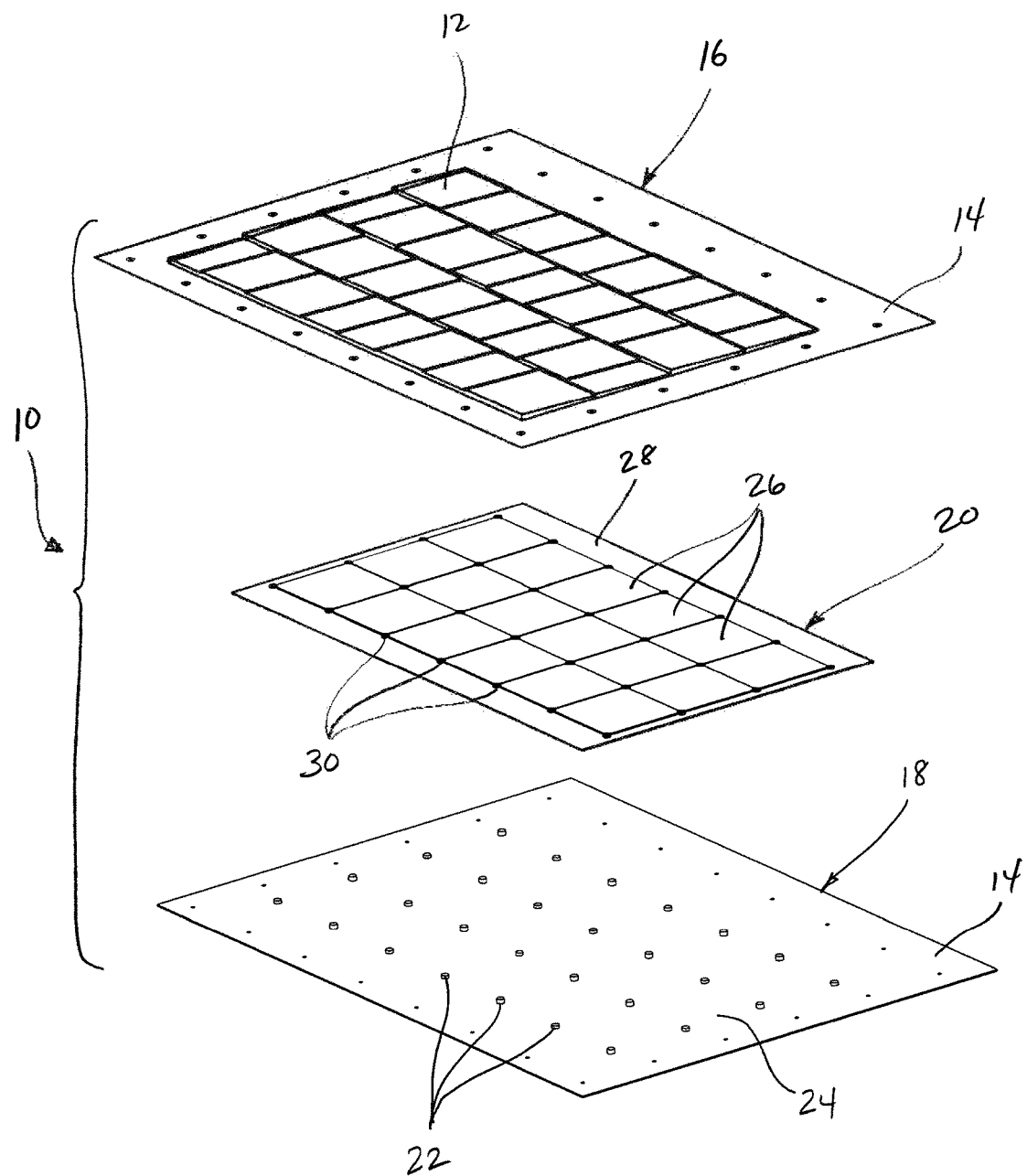
FIG. 2 is an exploded view thereof.

Referring to FIG. 2, an exploded view of the roofing panel 10 is shown. The roofing panel includes a top panel 16, a bottom panel 18, and at least one photovoltaic cell assembly 20 captured between the top panel 16 and the bottom panel 18. The bottom panel 18 has a lower surface that is configured to be secured to the roof of a building.

The top panel 16 may be made from clear or translucent plastic, such as polycarbonate. The top panel 16 includes the textured outer surface 12 of the roofing panel 10, which provides a three-dimensional relief of a roof shingle. Although a profile of a traditional asphalt roofing shingle is shown, other patterns may be formed on the textured surface 12 to present a different visual appearance or emulate a different material, such as terracotta, wood, metal, slate or other desirable architectural shingle styles as are known in the art. If made of plastic, the top panel 12 may be extruded, thermoformed and/or injection molded.

Figure 3:
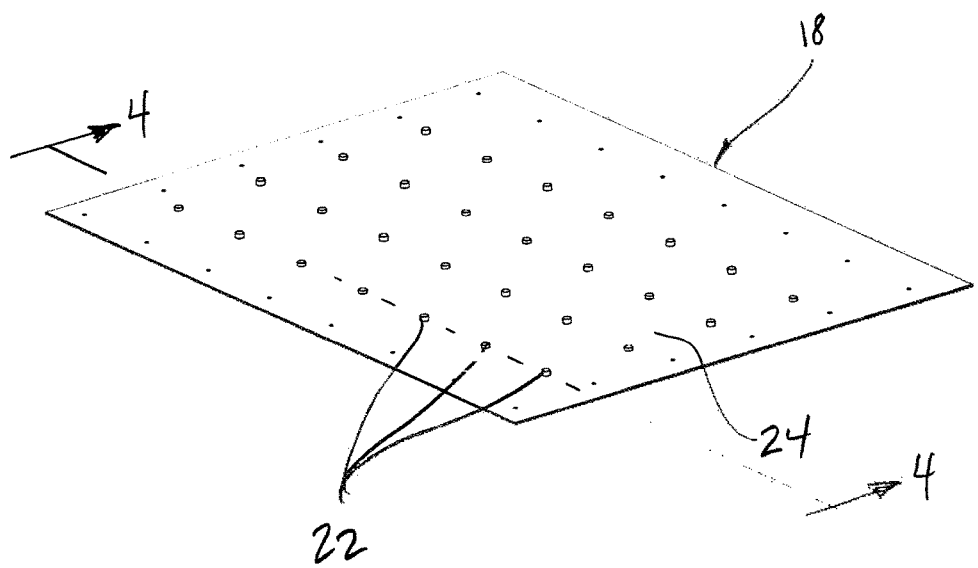
FIG. 3 is a perspective view of a bottom panel thereof.
Figure 4:
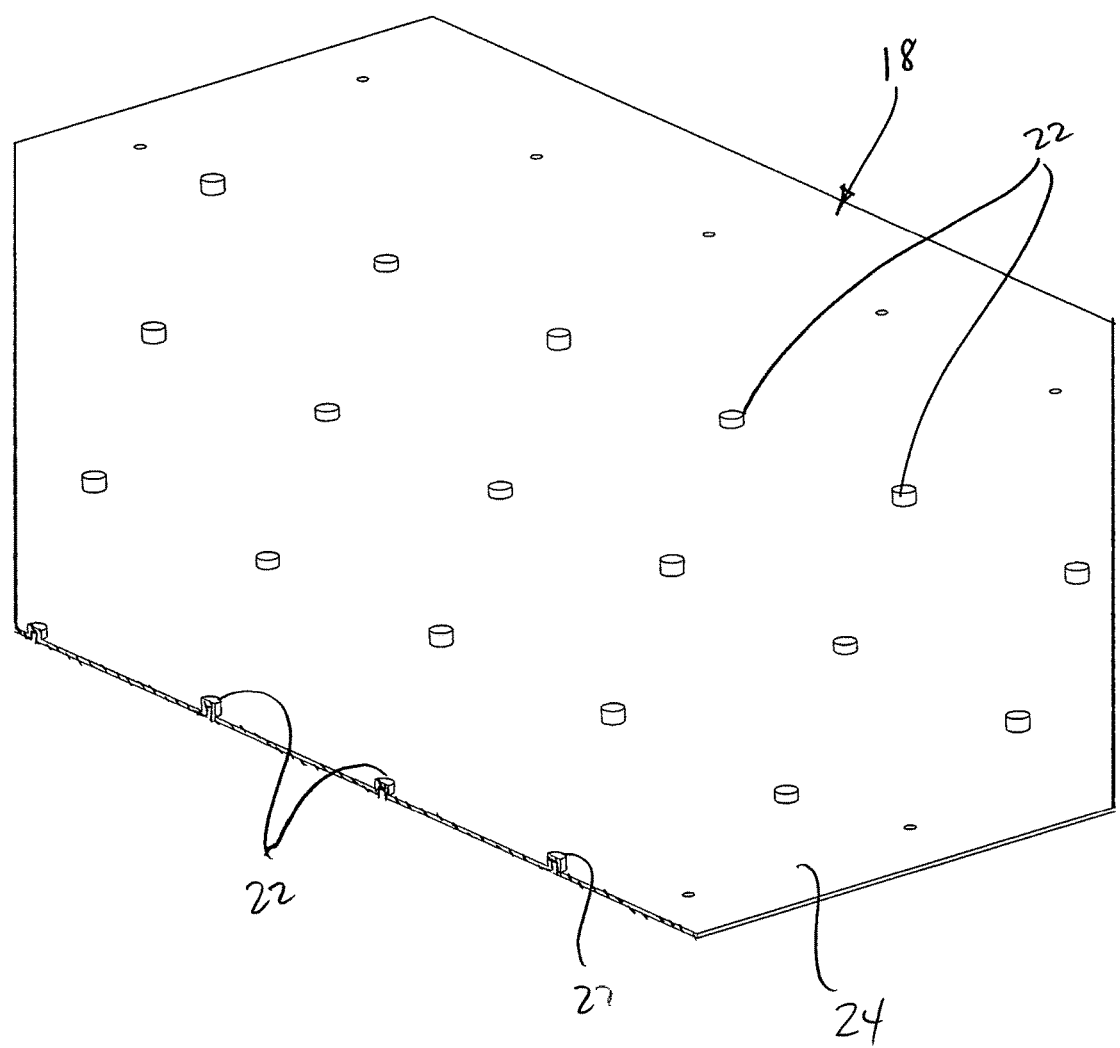
FIG. 4 is a partial view through line 4-4 of FIG. 3.

Referring to FIGS. 3 and 4, the bottom panel 18 is shown having a plurality of spaced-apart dimples 22 distributed over a top surface 24 thereof. The bottom panel 18 may be made from plastic such as polycarbonate. The plastic of the bottom panel 18 may be pigmented, such as black, in order to make the roofing panel 10 blend with roofing of the building. Other colors may be used as desired to better blend with the selected roofing shingles. The dimples of are preferably hollow (best seen in FIG. 4 and FIG. 7) in order to permit fastening of the bottom panel 18, such as through sonic welding, to the top panel 16. Other fastening techniques could be used, such as adhesive or mechanical fasteners, such as rivets, for instance. The dimples 22 may be distributed in a grid pattern over the top surface 24 of the bottom panel 18. Although a grid of squares is shown, the grid may have other geometric shapes, such as triangles, rectangles, hexagons, for instance. If made of plastic, the bottom panel 18 may be extruded, thermoformed and/or injection molded.

Figure 5:
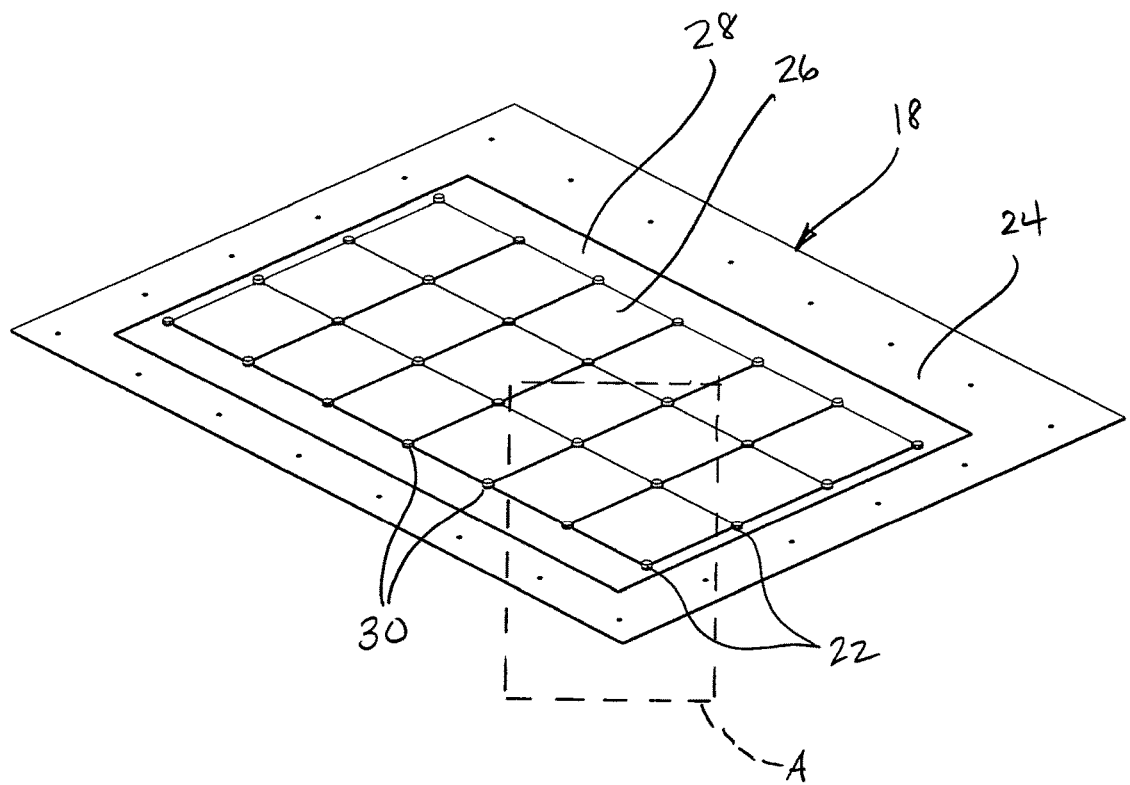
FIG. 5 is a perspective view of a bottom panel and laminated solar cell panel thereof.
Figure 6:
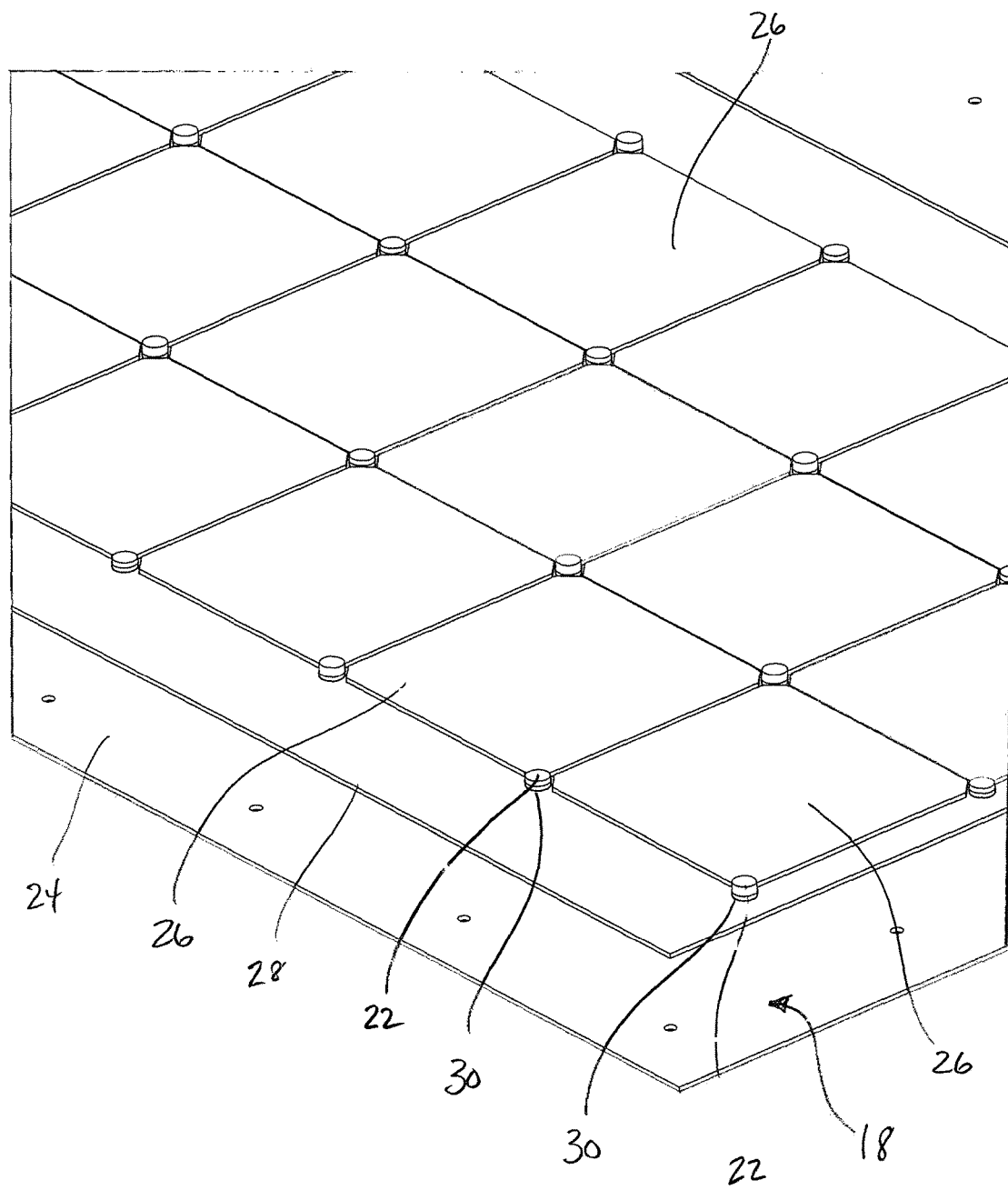
FIG. 6 is a close-up view of Inset A of FIG. 5.

Referring to FIGS. 5 and 6, the integrated photovoltaic cell assembly (or intermediate layer) 20 mounted on the bottom panel 18 is shown. The photovoltaic cell assembly 20 includes a plurality or array of solar cells 26 mounted to on an intermediate or laminated layer 28. The laminated layer 28 may be made of one or more layers of flexible plastic, such as an elastomeric polymer. For instance, EVA may be used. The laminated layer 28 includes a plurality of apertures 30 configured to overlay the plurality of dimples 22 on the bottom panel 18. That is, the apertures 30 are arranged in a grid pattern complimentary to the grid of dimples 22 on the bottom panel 18. The plurality of solar cells 26 are sized and dimensioned to fit within the grid spaces formed by the plurality of apertures 30 on the laminated layer 28. The plurality of solar cells 26 may be electrically connected together or arranged in a number of banks. The solar cells 26 may be secured to the laminated layer 28 via adhesive or heat treatment. Furthermore, the solar cells 26 may be sandwiched between one or more layers of the laminated layer 28.

Figure 7:
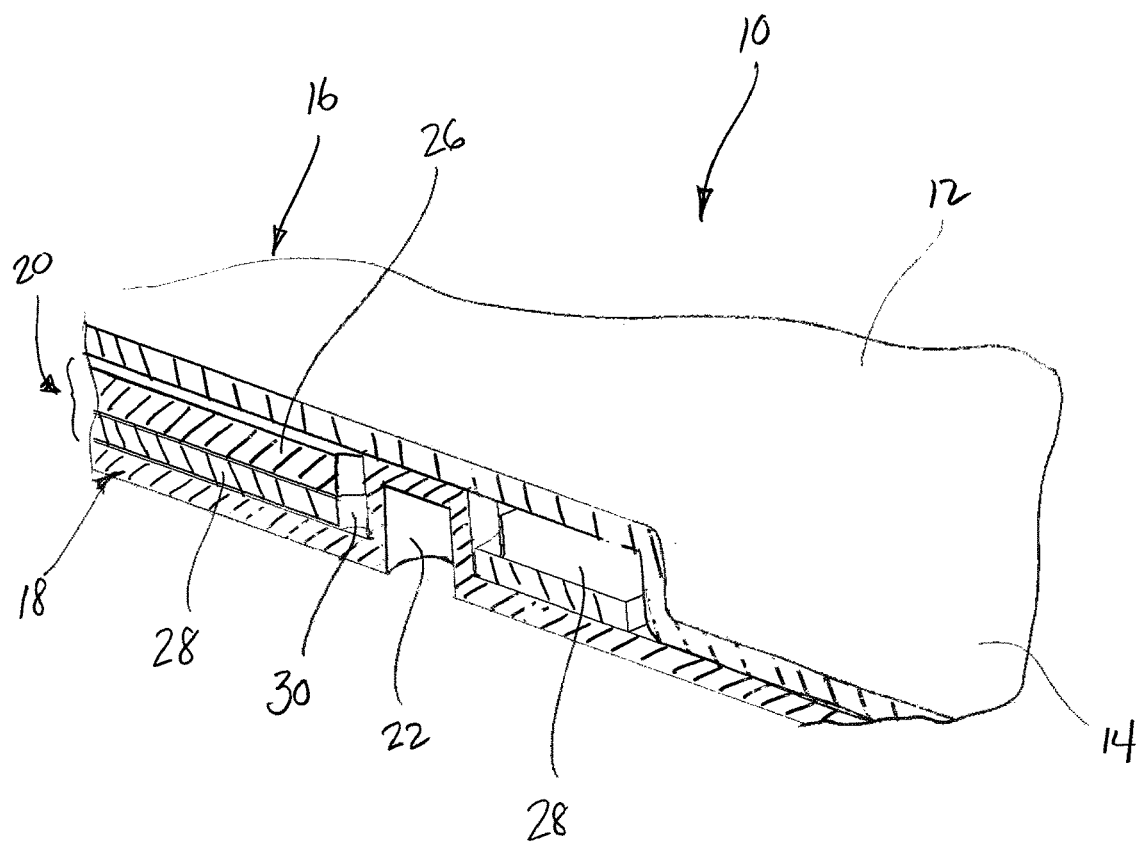
FIG. 7 is a partial view through line 7-7 of FIG. 4

Referring to FIG. 7, the bottom panel 18, photovoltaic cell assembly 20 and top panel 16 are sandwiched together to form a complete roofing panel 10. The dimples 22 of the bottom panel 18 project through the apertures 30 of the laminated layer 28 and contact the bottom surface of the top panel 16. The dimples 22 are then sonically welded to the top panel 16, which permanently fastens the layers 16, 18, 20 of the roofing panel 10 together. An inert gas, such as nitrogen or argon, for instance, may be captured between the top panel and bottom panel to enhance the efficiency of the solar cells and provide additional insulation to the roofing panel.

When the roofing panel 10 is installed on a roof, and when the roofing panel is exposed to sunlight, the at least one photovoltaic cell converts solar energy to electricity. To transfer electric power to an electrical system, an electrical power storage device, or another electrical component, at least one wire is connected to the at least one photovoltaic cell, and at least one wiring port hole is defined in the bottom panel. Each wiring port hole is dimensioned and configured so that at least one of the at least one wire can pass through the respective wiring port hole.

As described above, the top panel is light-transmitting and is configured to visually match at least one roofing material. Because the top panel transmits light, it allows light to pass through the top panel so that the light can be converted to electricity by the at least one photovoltaic cell that is positioned between the top panel and the bottom panel.

The present invention also provides a method of manufacturing a roofing panel having an integrated photovoltaic cell for a roof of a building, illustrated generally at FIG. 8.

In a first step, a top panel 14 is formed having a textured surface.

In a second step, a bottom panel 18 is formed having a plurality of dimples 22 distributed over a top surface 24 thereof.

In a third step, an intermediate layer 20 is formed having a plurality of apertures 30 thereon, wherein the apertures 30 and sized and dimensioned to be received over the dimples 22 of the bottom panel 18.

In a fourth step, a photovoltaic cell 26 is formed by securing a plurality of solar cells to the intermediate layer 20 with one or more of lamination, adhesive and/or heat treatment. For instance, solar cells 26 may be placed between two layers of EVA plastic and then heated until the EVA melts and adheres to the opposing layer of EVA and the solar cells 26. Alternatively, the solar cells 26 may be adhered to the laminated layers using a contact adhesive or other adhesive.

In a fifth step, the intermediate layer 20 is placed on the bottom panel 18, where the dimples 22 on the bottom panel 18 are aligned to project through the apertures 30 on the laminated layers of the photovoltaic cell assembly 20.

In a sixth step, the top panel 12 is placed over the bottom panel 18 where the dimples 22 contact the bottom surface of the top panel 12.

In a seventh step, the top panel 12 is secured to the bottom panel 18, forming a roofing panel 10. In one embodiment, the dimples 22 may be sonically welded to the bottom surface of the top panel 12. In other embodiment, the dimples 22 may be adhered to the top panel 12. In other embodiments, the dimples 22 may be mechanically fastened to the top panel 12 using rivets, screws, or other fasteners, for instance.

An inert gas, such as nitrogen or argon, for instance, may be captured between the top panel 12 and bottom panel 18 to enhance the efficiency of the solar cells 26 and provide additional insulation to the roofing panel 10.

Although the steps are shown and described in a particular order, it is to be understood that the steps do not necessarily need to be performed in the recited order. For instance, the forming of the top panel 12, bottom panel 18 and intermediate panel 20 recited in the first three step above may occur in any order.

The present invention also provides a method of installing one or more roofing panels 10 having an integrated photovoltaic cell 20 on a roof 32 of a building. FIG. 9 generally show steps in an exemplary embodiment of a method of installing the roofing panels 10 of the present invention and FIG. 10 shows an exemplary roofing panel 10 partially installed on a roof 32.

First, at least one roofing panel 10 is provided. Each roofing panel further comprises a bottom panel 18, a top panel 14, and at least one photovoltaic cell 20 captured between the top panel 14 and the bottom panel 18, as described above. The bottom panel 18 has a lower surface that is configured to be secured to the roof 32 of a building.

Then, a user positions the lower surface of the bottom panel 18 of one of the at least one roofing panels so that the respective lower surface is in adjacent facing relation with a roof 32 of a building.

The user secures the roofing panel 10 to the roof 32 of the building by fasteners. For example, the user can use nails to secure the roofing panel 10 to the roof 32 of the building. Nails or fasteners are driven through the flashing 14 of the roofing panel 10.

The user passes wires from photovoltaic cells so that the photovoltaic cells can be connected to electrical systems, electrical power storage devices, electrical components, etc.

The user may optionally place another roofing panel 10 adjacent to the previously installed roofing panel, so that the respective flashings 14 abut. By subsequently securing additional roofing panels 10 to the roof 32, the user can cover a greater portion of the roof with roofing panels 10.

With the roofing panels 10 secured to the roof 32, the user covers remaining portions of the roof with other roofing materials 34, such as conventional shingles. The shingles extend over flashing 14 of the panels 10 that extend from the perimeter of and in between the array of roofing panels 10. Due to this texture on the upper surface of the top panel 12, the appearance of the building is at least substantially similar to a building that has a roof 32 that is entirely covered by conventional shingles 34.

The photovoltaic cells included in the panels 10 can be any photovoltaic cells 20 that can be positioned between the top panel 14 and the bottom panel 18, such as commercially available photovoltaic cells currently known or not yet developed.

It can therefore be seen that the present invention provides a roofing panel with an integrated photovoltaic cell; provides a roofing panel that reduces assembly cost; provides a roofing panel that reduces weight; provides a roofing panel that reduces installation time; provides a roofing panel that serves the dual function of protecting a roof while converting solar energy to electrical energy; provides a roofing panel that is dimensionally stable and avoids the use of glass; and provides a photovoltaic cell integrated into a roofing panel that is aesthetically pleasing. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A photovoltaic roofing panel comprising:
   a polymeric, opaque bottom panel, the bottom panel having an outer flange area surrounding a central area, the bottom panel having a lower surface configured to be secured to the roof of a building, and further having an upper surface including a plurality of dimples extending upwardly from said central area of said upper surface, said dimples being arranged in an array;
   a photovoltaic cell assembly including a polymeric supporting panel having a plurality of apertures arranged in an array corresponding to said dimples, said polymeric supporting panel being received on said upper surface of said bottom panel in mated relation with said dimples extending through said apertures,
   said photovoltaic cell assembly further including a plurality of photovoltaic cells arranged in an array and secured to an upper surface of said supporting panel between said apertures and dimples; and
   a polymeric, light transmissive top panel having a planar outer flange area surrounding a raised central area, said raised central area including a roofing shingle textured outer surface, said top panel being received over said bottom panel wherein said outer flange area of said top panel overlies said outer flange area of said bottom panel to form a nailing flange, said dimples engaging a lower surface of said raised central area of the top panel,
   said top and bottom panels being secured together at least at the engagement of said dimples and said lower surface of said central area of said top panel.

2. The photovoltaic roofing panel of claim 1, further comprising an inert gas captured between said secured top and bottom panels.

3. The photovoltaic roofing panel of claim 1, wherein the dimples are sonically welded to said lower surface of said top panel.

4. A method of installing photovoltaic cells on a roof of a building, the method comprising the steps of:
   providing a photovoltaic roofing pane comprising
      a polymeric, opaque bottom panel, the bottom panel having an outer flange area surrounding a central area, the bottom panel having a lower surface configured to be secured to the roof of a building, and further having an upper surface including a plurality of dimples extending upwardly from said central area of said upper surface, said dimples being arranged in an array;
      a photovoltaic cell assembly including a polymeric supporting panel having a plurality of apertures arranged in an array corresponding to said dimples, said polymeric supporting panel being received on said upper surface of said bottom panel in mated relation with said dimples extending through said apertures, said photovoltaic cell assembly further including a plurality of photovoltaic cells arranged in an array and secured to an upper surface of said supporting panel between said apertures and dimples; and a polymeric, light transmissive top panel having a planar outer flange area surrounding a raised central area, said raised central area including a roofing shingle textured outer surface, said top panel being received over said bottom panel wherein said outer flange area of said top panel overlies said outer flange area of said bottom panel to form a nailing flange, said dimples engaging a lower surface of said raised central area of the top panel, said top and bottom panels being secured together at least at the engagement of said dimples and said lower surface of said central area of said top panel;

positioning the lower surface of the bottom panel of one of the said roofing panel so that the respective lower surface is in adjacent facing relation with a roof of a building;

securing the roofing panel to the roof of the building by using fasteners through said outer flange area; and securing roofing shingles on said roof overlapping said outer flange area and abutting said raised roofing shingle textured central area whereby the photovoltaic roofing panel appears as an integral part of a shingled roof.

* * * * *